United States Patent Office 3,658,777
Patented Apr. 25, 1972

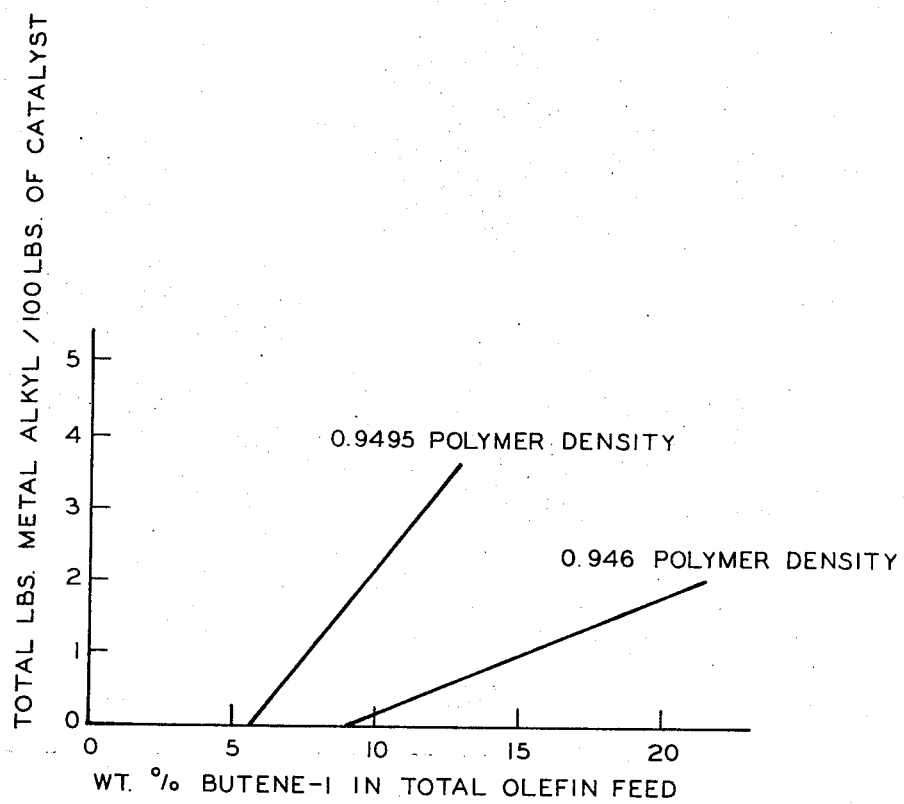

3,658,777
CONTROLLING POLYMERIZATION OF
COMONOMER IN COPOLYMERIZATION
William B. Green, Bartlesville, Okla., assignor to
Phillips Petroleum Company
Filed Sept. 12, 1969, Ser. No. 857,377
Int. Cl. C08f 1/66, 1/82, 15/04
U.S. Cl. 260—88.2 R                                6 Claims

ABSTRACT OF THE DISCLOSURE

The polymerization of comonomer in a copolymerization as in the copolymerization of ethylene and butene-1 is controlled by increasing the metal alkyl in the reaction zone. In one embodiment the changeover time in a plant when desiring to produce a homopolymer of a 1-olefin without plant shutdown when it has been producing a 1-olefin-olefin comonomer copolymer is reduced by adding to the influent to the reaction zone, about when the comonomer flow has been discontinued, a metal alkyl which inhibits the copolymerization of the comonomer with the 1-olefin. In an embodiment the changeover is from ethylene-1-butene copolymerization to ethylene homopolymerization and the catalyst is a chromium oxide in which at least part of the chromium is in the hexavalent state and is supported on at least one material taken from silica, alumina, zirconia and thoria and the metal alkyl is diethyl zinc alone or together with triethyl borane. The amount of the additive or additive mixture is determined to inhibit substantially the copolymerization of the comonomer until the amount of it in the reactor has been reduced to an extent sufficient to permit substantially specification homopolymer to be produced. The usual rates when adding diethyl zinc to increase the shear response of the polymer being made are up to about one-three pounds per hundred pounds of the catalyst. The amount according to the invention exceeds appreciably this amount and usually is in the approximate range five-ten pounds per hundred pounds of catalyst. The invention permits a control of the proportion of comonomer entering into the copolymer being formed independently of adjustment of the portion of the comonomer in the feed to the reactor.

---

This invention relates to the polymerization of an olefin. More particularly, it relates to the polymerization of a 1-olefin. In one of its aspects the invention relates to a process for the polymerization of a 1-olefin to form a homopolymer. In another of its aspects the invention relates to a process for the polymerization of a 1-olefin and olefin comonomer. In a further aspect of the invention it relates to controlling at a given time the proportion of comonomer which is present with respect to its entering into the polymerization. In another of its aspects the invention relates to reducing the time required for changeover from a copolymerization, as described herein, to a homopolymerization.

According to a concept of the invention, it provides a process for controlling the proportion of comonomer which is present in a monomer-comonomer polymerization as to its entry into the polymerization, for example, controlling the amount of butene-1 entering into polymerization with ethylene by adding to the polymerization or considerably increasing therein a metal alkyl such as diethyl zinc and/or triethyl borane which may already be present in the reaction. In another of its concepts the invention provides for reducing the time of a changeover from a copolymerization, as herein described, to a homopolymerization by adding to said operation, about when flow of comonomer has been or is about to be discontinued, a proportion of metal alkyl which is appreciably larger than that ordinarily used as in the increase in shear response of the polymer.

It is known to polymerize olefins. U.S. Pat. No. 2,825,-721, Mar. 4, 1958, John Paul Hogan and Robert L. Banks, discloses and claims a process which comprises polymerizing at least one polymerizable olefin, at a polymerization temperature up to about 500° F., with a catalyst active for such polymerization and comprising, as the sole essential effective catalytic ingredients thereof, chromium oxide and at least one material selected from the group consisting of silica, alumina, zirconia, and thoria, at least part of the chromium being in the hexavalent state at the initial contacting of hydrocarbon with said catalyst. It is also known to feed metal alkyls to a polyethylene solution process reactor to increase the shear response of the polymer being produced. Further, it is known to convert from a copolymer producing operation to a homopolymerization without shutting down the operation unit.

I have now discovered, see the graph in the drawing, that at a constant polymer density the concentration of comonomer, e.g., butene-1, in the total olefin feed must be increased as metal alkyl addition is increased. Stated otherwise, at a given concentration of butene-1 in the total olefin feed to the reactor, the density of the resulting copolymer is higher when metal alkyls are being added because the addition of the metal alkyl or alkyls lowers the amount of the butene-1 converted to polymer. Thus, it is found that the polymer density is a measure of the degree of butene-1 incorporated into the polymer and the higher the butene-1 incorporation, the lower will be the density. Thus, I have discovered that the metal alkyl, for example, diethyl zinc, or metal alkyls mixture, diethyl zinc-triethyl borane inhibits the incorporation of butene-1 into the polymer during the copolymerization of ethylene and butene-1. It can be said that the metal alkyl or metal alkyls reduce the conversion per pass of butene-1 to polymer.

Accordingly, I have conceived of controlling the proportion of comonomer entering into the copolymerization or polymerization by increasing appreciably the proportion of metal alkyl or metal alkyls present in the polymerization reactor or zone.

Still further, I have conceived of a process for reducing the changeover time taken when converting an operation producing copolymer to one producing homopolymer by simply increasing or adding to the operation to inhibit polymerization of the comonomer, e.g., butene-1, a metal alkyl as herein described or its equivalent.

An object of this invention is to provide a process for the polymerization of an olefin. Another object of the invention is to provide a process for the copolymerization of an olefin and a comonomer, for example, a 1-olefin. It is a further object of this invention to provide a process for controlling the proportion of comonomer entering into a polymerization. Still further, it is an object of this invention to provide a process for more rapidly changing over from a copolymerization to a homopolymerization, for example, in the case of a changeover from copolymerization of ethylene and butene-1 to a homopolymerization of ethylene.

Other aspects, concepts and object of the invention are apparent from a study of this disclosure, the drawing and the appended claims.

According to the invention the proportion of comonomer entering into a copolymerization, as in the copolymerization of ethylene and butene-1, is controlled by use of a metal alkyl, as herein described, to inhibit appreciably the copolymerization without inhibiting the homopolymerization as by adding to the reaction zone in which the control is to be effected an amount of a metal alkyl, for example, diethyl zinc and/or triethyl borane, which is appreciably larger than that ordinarily employed therein, if any.

Presently, in a reaction for the production of ethylene-butene-1 copolymer there will be added normally approximately .3 to about 3 pounds of metal alkyl or metal alkyls per 100 pounds of catalyst, the catalyst being a known chromium oxide catalyst as described in U.S. Pat. No. 2,825,721, above mentioned. According to the present invention the amount of metal alkyls will be appreciably increased during changeover from copolymer to ethylene homopolymer manufacture to exceed the amount normally used. For example, it is now preferred to increase the amount of the metal alkyls to one in the approximate range of from 5 to 10 pounds per 100 pounds of said catalyst, during such changeover.

Thus, when a changeover from copolymerization to homopolymerization as described herein, is contemplated to be effected, then when the flow of comonomer has been or is about to be discontinued, the diethyl zinc or triethyl borane or equivalent additive is, at least for a time, increased substantially beyond whatever it has been to inhibit polymerization of the comonomer until such time as the reaction zone has been substantially purged of the comonomer.

Referring to the drawing and to the graph therein, it will be seen that for given polymer density, as the weight percent butene-1 in the total olefin feed to the reactor increases the pounds of total metal alkyls, e.g., diethyl zinc and triethyl borane, per 100 pounds of catalyst fed to the reactor, also increases. As stated polymer density is a measure of the degree of butene-1 incorporation into the polymer, i.e., the higher the butene-1 incorporation, the lower will be the density. Hence, the inhibiting effect of the metal alkyls is demonstrated.

EXAMPLE I

The following are the conditions generally employed in the manufacture of copolymer from ethylene and butene-1.

COPOLYMER MANUFACTURE

| | Broad range | Specific |
|---|---|---|
| Reactor zone: | | |
| Temperature, °F | 255–330 | 280 |
| Pressure, p.s.i.g | 400–450 | 420 |
| Materials, #/hr.: | | |
| Ethylene | 1,000–3,000 | 2,000 |
| Butene-1 | 50–600 | 120 |
| Diethyl zinc (#/100# catalyst) (DEZ) | 0.3–3 | 2 |
| Catalyst | 0.5–4 | 2 |
| Cyclohexane | 4,000–18,000 | 14,000 |
| Product: | | |
| Melt index | 0.2–13 | 0.5 |
| Density | 0.944–0.952 | 0.9495 |
| Shear response | 2.5–18 | 10 |

According to the invention, when the flow of butene-1 is discontinued, the DEZ is increased up to about 5 or more pounds per 100 pounds of catalyst entering the reaction zone. The metal alkyl is safely and conveniently handled and added to the reactor as a dilute solution in cyclohexane which, as indicated, is the diluent in the reaction zone.

EXAMPLE II.—CHANGEOVER TO HOMOPOLYMER
(Two hour operation)

| | Broad range | Specific |
|---|---|---|
| Reactor zone: | | |
| Temperature, °F | 280–345 | 285 |
| Pressure, p.s.i.g | 400–450 | 420 |
| Materials, #/hr.: | | |
| Ethylene | 1,000–3,000 | 2,000 |
| Butene-1 | 0 | 0 |
| Diethyl zinc (#/100# catalyst) (DEZ) | 5–10 | 7.5 |
| Catalyst | 0.5–4 | 2 |
| Cyclohexane | 4,000–18,000 | 14,000 |
| Product: | | |
| Melt index | 0.2–6 | 0.25 |
| Density | 0.961–0.965 | 0.961 |
| Shear response | 3–15 | 13 |

EXAMPLE III.—HOMOPOLYMER MANUFACTURE

| | Broad range | Specific |
|---|---|---|
| Reactor zone: | | |
| Temperature, °F | 275–340 | 280 |
| Pressure, p.s.i.g | 400–450 | 420 |
| Materials, #/hr.: | | |
| Ethylene | 1,000–3,000 | 2,000 |
| Butene-1 | 0 | 0 |
| Diethyl zinc (#/100# catalyst) (DEZ) | 0 | 0 |
| Catalyst | 0.5–4 | 2 |
| Cyclohexane | 4,000–18,000 | 14,000 |
| Product: | | |
| Melt index | 0.2–6.0 | 0.25 |
| Density | 0.961–0.965 | 0.961 |
| Shear response | 2.5–9 | 7 |

The catalyst used in the foregoing examples is one prepared as in said U.S. Pat. 2,825,721. This catalyst was one which had the following composition:

| | Weight percent |
|---|---|
| Silica | 98.6 |
| Alumina | 0.2 |
| Chrominum oxide [1] | 1.2 |

[1] The amount of hexavalent chromium is at least 0.1 percent of the weight of the catalyst component comprising the chromium oxide and associated oxides.

Generally, a catalyst according to U.S. 2,825,721 which is applicable to this invention will have the following approximate compositions: The support or base such as silica, silica-alumina (preferably the alumina being less than 50 percent by weight), thoria, zirconia, or composites thereof, in an amount of about 90 to about 99.9 weight percent; and the chromium oxide, the chromium content being present in the amount of 0.1 to about 10 weight percent, and the hexavalent content being at least 0.1 weight percent.

Among the known metal alkyls which can be used in the invention include $B(CH_3)_3$, $B(C_2H_5)_3$-TEB, $Al(CH_3)_3$, $Al(C_2H_5)_3$
$Al(C_3H_7)_3$, $Al(C_4H_9)_3$, $Al(C_6H_{13})_3$, $Ga(C_2H_5)_3$
$Ga(C_3H_7)_3$, $In(CH_3)_3$, $In(C_6H_{13})_2$, $Th(CH_3)_3$
$Th(C_4H_9)_3$, $Be(CH_3)_2$, $Be(C_6H_5)_2$, $Zn(C_2H_5)_2$-DEZ
$Zn(C_3H_7)_2$, $Zn(C_6H_5)_2$, $Mg(C_2H_5)_2$
$Mg(C_3H_7)_2$, $Mg(C_4H_9)_2$ and the like.

In conventional practice of changing from copolymer to homopolymer manufacture in which no diethyl zinc is used, it usually takes about four hours of production time before specification homopolymer is produced. During this changeover time about 4,400 pounds of off-specification product is produced.

With the invention in which relatively high diethyl zinc proportion is used, the changeover time required is but two hours with only 2,200 pounds of off-specification product being produced.

Although the invention has been described primarily with respect to the homopolymerization of ethylene and the copolymerization of ethylene and butene-1, it will be clear to one skilled in the art that the metal alkyls or equivalent can be similarly employed with other polymerizations. Thus, as comonomer, there can be used 1-olefins having from 3 to 8 carbon atoms per molecule.

The conditions of operation, diluent and other details which are normally extant in such operations are within the scope of one skilled in the art and those given here have been given by way of example only.

The preferred catalysts are the ones already mentioned. However, equivalent catalysts can be used.

Shear response is measured by the ratio of the now conventional CIL (Canadian Industries, Ltd.) flow index and the conventional melt index, and is dimensionless. The CIL flow index procedure is the flow, grams per 10 minutes, of polymer at 190° C. which passes through a 0.01925 inch diameter by 0.1755 inch long orifice under 1500 p.s.i.g. pressure in the CIL flow index machine. The conventional melt index is also measured in grams per 10 minutes, as is known in the polymer art.

Reasonable variation and modification are possible within the scope of the foregoing disclosure, drawing and the appended claims to the invention the essence of which is that the entry into polymerization of a comonomer can be controlled by adding to a reaction zone or increasing therein the metal alkyls during the polymerization of a monomer and comonomer, e.g., ethylene and butene-1, as described, and there has been provided a process for more rapidly converting from a copolymerization to a homopolymerization by adding to a reaction zone or increasing therein the amount of metal alkyls, also as described.

I claim:

1. A process for reducing the amount of comonomer being copolymerized in a reaction zone wherein ethylene and an olefin comonomer having 3-8 carbon atoms are being polymerized in the presence of a catalyst in a solution polymerization process, the catalyst being chromium oxide and at least one material selected from the group consisting of silica, alumina, zirconia and thoria, at least part of the chromium being in the hexavalent state at the initial contacting of hydrocarbon with said catalyst, in which a metal alkyl such as diethyl zinc and/or triethyl borane is used to alter the effect of the catalyst to increase the shear response of the polymer which comprises during said polymerization increasing substantially the amount of the metal alkyl in a manner to substantially inhibit for a time the entry into the polymerization of said olefin comonomer.

2. A process according to claim 1 in which the operation is to be changed over to a homopolymerization of the ethylene wherein about when the flow of comonomer to the reaction zone is discontinued the proportion of the metal alkyl in the influent to the reaction zone is appreciably increased to an extent sufficient to appreciably inhibit the formation of copolymer, thus reducing the time required for the changeover to homopolymerization and therefore the formation of off-specification product.

3. A process according to claim 2 wherein the metal alkyl is added at a rate in the approximate range 5 to 10 pounds of total metal alkyl per 100 pounds catalyst when the usual proportion for increasing shear response is in the approximate range of 0.3 to 3 pounds per 100 pounds of catalyst.

4. A process according to claim 3 wherein the plant is to be converted to polyethylene production and the comonomer being used is butene-1.

5. A process according to claim 4 wherein the catalyst comprises a support selected from at least one of silica, alumina, thoria, and zirconia in the amount of about 90 to 99.9 weight percent and a chromium content of about 0.1 to 10 weight percent, the hexavalent chromium content being at least about 0.1 weight percent.

6. A process according to claim 5 wherein the catalyst comprises 98.6 weight percent silica, 0.2 weight percent alumina, and 1.2 weight percent chromium oxide.

References Cited

UNITED STATES PATENTS

| | | | |
|---|---|---|---|
| 2,825,721 | 3/1958 | Hogan et al. | 260—94.9 D |
| 2,944,049 | 7/1960 | Edmonds, Jr. et al. | 260—94.9 D |
| 2,980,659 | 4/1961 | Witt | 260—88.2 R |
| 3,050,514 | 8/1962 | Cawthon, Jr. et al. | 260—94.9 D |
| 3,174,957 | 3/1965 | Hall | 260—88.2 R |
| 3,177,184 | 4/1965 | Cottle | 260—94.9 X D |
| 3,403,142 | 9/1968 | Craven | 260—88.2 X A |

JOSEPH L. SCHOFER, Primary Examiner

A. HOLLER, Assistant Examiner

U.S. Cl. X.R.

260—94.9 D, 94.9 P